(12) United States Patent
Herrara Caballero et al.

(10) Patent No.: US 10,834,788 B2
(45) Date of Patent: Nov. 10, 2020

(54) INDUCTION HEATING DEVICE

(71) Applicant: Aktiebolaget SKF, Gothenburg (SE)

(72) Inventors: Alberto Javier Herrara Caballero, Utrecht (NL); Sebastien David, Ouderkerk a/d Amstel (NL)

(73) Assignee: Aktiebolaget SKF, Gothenburg (SE)

( * ) Notice: Subject to any disclaimer, the term of this patent is extended or adjusted under 35 U.S.C. 154(b) by 274 days.

(21) Appl. No.: 15/837,860

(22) Filed: Dec. 11, 2017

(65) Prior Publication Data

US 2018/0177002 A1    Jun. 21, 2018

(30) Foreign Application Priority Data

Dec. 15, 2016    (GB) .................................. 1621317.5

(51) Int. Cl.
| | |
|---|---|
| *H05B 6/44* | (2006.01) |
| *H05B 6/40* | (2006.01) |
| *H05B 6/06* | (2006.01) |
| *H05B 6/10* | (2006.01) |
| *H05B 6/14* | (2006.01) |
| *F16C 35/063* | (2006.01) |
| *F16C 19/52* | (2006.01) |

(52) U.S. Cl.
CPC ............. *H05B 6/44* (2013.01); *F16C 19/525* (2013.01); *F16C 35/063* (2013.01); *H05B 6/06* (2013.01); *H05B 6/101* (2013.01); *H05B 6/14* (2013.01); *H05B 6/40* (2013.01); *F16C 2226/14* (2013.01); *F16C 2233/00* (2013.01)

(58) Field of Classification Search
CPC ... H05B 6/02; H05B 6/06; H05B 6/14; H05B 6/40; H05B 6/44; H05B 6/10; H05B 6/101; H05B 6/102; F16C 35/063; F16C 19/525; F16C 33/586; F16C 33/30; F16C 2226/16; F16C 2226/14; F16C 2223/00; F16C 2300/14; F16C 2300/54
See application file for complete search history.

(56) References Cited

U.S. PATENT DOCUMENTS

| | | | | |
|---|---|---|---|---|
| 2,476,935 A | * | 7/1949 | Wharff | ..................... H05B 6/40 219/657 |
| 3,705,285 A | | 12/1972 | Cachat | |

(Continued)

FOREIGN PATENT DOCUMENTS

| | | |
|---|---|---|
| EP | 2199416 A1 | 6/2010 |
| JP | 2004027275 A | 1/2004 |

(Continued)

*Primary Examiner* — David J Walczak
(74) *Attorney, Agent, or Firm* — Garcia-Zamor Intellectual Property Law; Ruy Garcia-Zamor; Bryan Peckjian

(57) ABSTRACT

An induction heating device comprising at least one induction coil mounted to a support frame. The support frame is adapted to travel on a surface of an annular metal article to be heated and comprises a wheel set having one or more driven wheels. The support frame is adapted to travel on a side face of the annular metal article and is provided with first guide and second guide elements, which are respectively configured to engage with an outer circumferential surface and an inner circumferential surface of the annular metal article to ensure that the support frame travels on a circular path during use of the device.

15 Claims, 2 Drawing Sheets

(56) References Cited

U.S. PATENT DOCUMENTS

| | | | |
|---|---|---|---|
| 4,388,593 A * | 6/1983 | Mittleman | G01N 27/9033 |
| | | | 324/216 |
| 4,749,419 A * | 6/1988 | Sommer | C21D 9/06 |
| | | | 148/569 |
| 5,248,865 A | 9/1993 | Tyler | |
| 5,660,753 A | 8/1997 | Lingnau | |
| 6,794,622 B1 | 9/2004 | Alveberg et al. | |
| 8,950,649 B2 * | 2/2015 | Sexton | F16C 33/00 |
| | | | 228/44.3 |
| 9,521,707 B2 | 12/2016 | Weerapakkaroon et al. | |
| 2012/0125919 A1 | 5/2012 | Tanaka et al. | |
| 2015/0334782 A1 | 11/2015 | Garvey et al. | |

FOREIGN PATENT DOCUMENTS

| | | |
|---|---|---|
| JP | 2004027276 A | 1/2004 |
| JP | 2006179359 A | 7/2006 |
| JP | 2009242823 A | 10/2009 |
| WO | 2015175069 A1 | 11/2015 |

\* cited by examiner

INDUCTION HEATING DEVICE

CROSS-REFERENCE TO RELATED APPLICATIONS

This application claims priority to British patent application no. 1621317.5 filed on Dec. 15, 2016, the contents of which are fully incorporated herein by reference.

FIELD OF THE PRESENT INVENTION

The present invention relates to a device comprising an induction coil for heating a metal article such as a rolling element bearing or a gear, by inducing eddy currents in the metal article.

BACKGROUND

An example of an induction heating device for heating a rolling element bearing is disclosed in U.S. Pat. No. 5,248,865. The device includes a hinged, clamp-like magnetically inductive core of ferrite, which can be opened to receive the bearing, and which has a primary winding and a source of high frequency current. If the bearing has a large diameter of e.g. more than 70 cm, then several such devices are typically needed to perform the heating, whereby the bearing needs to be hoisted and then inserted through each opened device.

An example of an induction heating device for heat-treating a bearing ring of a rolling element bearing is disclosed in JP 2006179359. In this example, the device comprises an induction coil that is formed from two U-shaped conductors, the legs of which are adapted to straddle the inner and outer circumferential surfaces of the bearing ring. Induction heating is performed while the ring is rotated on a turntable.

There seems to be room for improvement in terms of providing a device for induction heating of a large-size annular metal article that can be performed without the need to hoist the article onto the device.

BRIEF SUMMARY OF THE PRESENT INVENTION

The present invention resides in an induction heating device comprising one or more induction coils mounted to support frame. According to the invention, the support frame is adapted to travel on a surface of a metal article to be heated and comprises a wheel set having at least one driven wheel.

The device is adapted to induce eddy currents in a surface or surfaces of an annular metal object, such as a gear or a rolling element bearing, whereby the support frame is adapted to travel on a side face of the annular metal article. To ensure that the device travels on a circular path during heating, the support frame is provided with one or more first and second guide elements at first and second sides of the device. The one or more first guide elements engage with an outer circumferential surface of the annular metal article; the one more second guide elements engage with an inner circumferential surface of the annular metal article. Suitably, the first and second sides of the device are connected by a linkage that is adjustable in length, so that the device can easily be adapted for annular articles of different sizes having a different radial distance between the inner and outer circumferential surfaces.

In some examples, each of the one or more coils is arranged in a heating plate. This is beneficial in terms of realizing a lightweight device. Alternatively, each coil may comprise a ferritic core. This will increase the weight of the device, but may be beneficial when heating very large-sized articles, where more inductive heating power is required.

In an example of the preferred embodiment, the heating device comprises first and second induction coils respectively arranged in first and second heating plates. The first and second heating plates are mounted to the support frame at the first and second sides of the device and are connected by an adjustable linkage as described above. When the induction heater is placed on a side face of the annular object, the first heating plate is adapted to face the outer circumferential surface and the second heating plate is adapted to face the inner circumferential surface. In this example, the device has a U-shaped geometry formed by the first and second heating plates and the linkage, whereby the heating plates extend beyond a plane on which the wheels of the device run.

In an alternative example, the device is adapted to induce eddy currents in a surface of the metal article that lies in the same plane as the plane on which the wheels run.

The support frame may comprise first and second wheel sets arranged at the first and second sides of the induction heater. When the object to be heated is a rolling element bearing having an outer bearing ring and an inner bearing ring, the first wheel set is adapted to travel on a side face of the outer ring, while the second wheel set is adapted to travel on a side face of the inner ring.

As a result, the bearing can be heated while it rests on e.g. a pallet, without the need to hoist it onto a heating device.

Typically, rolling element bearings are heated in order to expand the inner diameter of the inner ring to enable shrink-fit mounting on a shaft. It is also beneficial to heat the outer ring, to prevent a temperature difference that would damage the bearing, due to excessive thermal expansion of the inner ring relative to that of the outer ring. The outer ring has a larger mass than the inner ring, meaning that more energy is required to heat the outer ring, to induce the same temperature rise as in the inner ring. Thus, in a further development the first heating plate is larger than the second heating plate.

Suitably, the support frame of the induction heater comprises a power cable connection point for enabling alternating current to be supplied to the one or more induction coils. The necessary power may be supplied from a control cabinet that generates alternating current. Preferably, the current supply to each induction coil of the device can be regulated on the basis of one or more measured temperature signals. The regulation can comprise adjusting the amount of power supplied to each coil or deactivating the coil. When the device is adapted to heat a rolling element bearing and has first and second coils, a control circuit of the current generator may have a first temperature signal input for a temperature measured on the outer ring and a second temperature signal input for a temperature measured on the inner ring. In one example, the control circuit is configured to regulate the current supply to each of the first and second induction coils based on a measured temperature difference between the two bearing rings. The control circuit may additionally be configured to regulate the current supplied to each coil based on a measured temperature difference between different locations on the same bearing ring, or on a rate of temperature increase at a measured location.

During heating, the inventive device travels on the metal article to be heated. The locally induced temperature rise is thus also dependent of the speed of travel. One or more of the wheels is coupled to a drive mechanism, such as an electric motor. Advantageously, the torque supplied by the drive mechanism is adjustable in order to adjust the speed of travel. In a further development, the device is equipped with a control unit that is programmed to automatically control the speed of travel, based on one or more inputs. The inputs may include measured temperature and fixed parameters relating to the size of the article to be heated, e.g. the diameter and mass of the inner and outer rings of a bearing.

Preferably, the control unit for controlling the speed of the device includes at least one temperature signal input for receiving a measured temperature. In some embodiments, the device comprises one or more temperature sensors mounted to the support frame. The temperature sensors may be contact temperature sensors or non-contact, radiation-based temperature sensors. In other embodiments, the control unit is configured to receive temperature signals from remote temperature sensors which, again, may be based on contact or contactless measurement.

When the device is configured to heat a bearing, the control unit suitably comprises at least one temperature signal input for receiving a temperature measured on the inner ring and at least one temperature signal input for receiving a temperature measured on the outer ring. Again, temperature may be measured at more than one location on the inner and outer rings and the control unit may comprise a corresponding number of temperature signal inputs. Speed may then be controlled on the basis of a temperature difference between different locations on the same ring, or on a rate of temperature increase at a measured location.

In an embodiment, the control unit forms part of the heating device and may be integrated in or mounted to the support frame. In an alternative embodiment, the control unit is integrated in the control cabinet that supplies the alternating current to the heater, whereby the drive for the at least one driven wheel is equipped with means for receiving a control signal from the control unit. The control signal may be transmitted wirelessly or via a connection wire.

In some examples, the control unit comprises a user interface for manually inputting data such as the dimensions and mass of the article to be heated, or e.g. a bearing designation, and the target temperature to be achieved. In other examples, the control unit is configured to receive this information remotely from e.g. a mobile telephone app.

In embodiments where the device comprises a heating plate, the plate may be a flat plate. In a further development, when the device comprises a heating plate that is arranged to face a circumferential surface, the heating plate is curved to match the curvature of the circumferential surface. Thus, a constant distance can be maintained between the surface of the heating plate and the circumferential surface. In a preferred example, the heating plate is flexible such that the curvature can be adjusted to correspond to the curvature of the circumferential surface as required, depending on the size of the bearing.

Other advantages of the invention will become apparent from the following detailed description and accompanying drawings.

BRIEF DESCRIPTION OF THE DRAWINGS

FIG. 1b presents a side view of the induction heater as originally introduced in FIG. 1a.

DETAILED DESCRIPTION OF THE PRESENT INVENTION

Figure 1A:
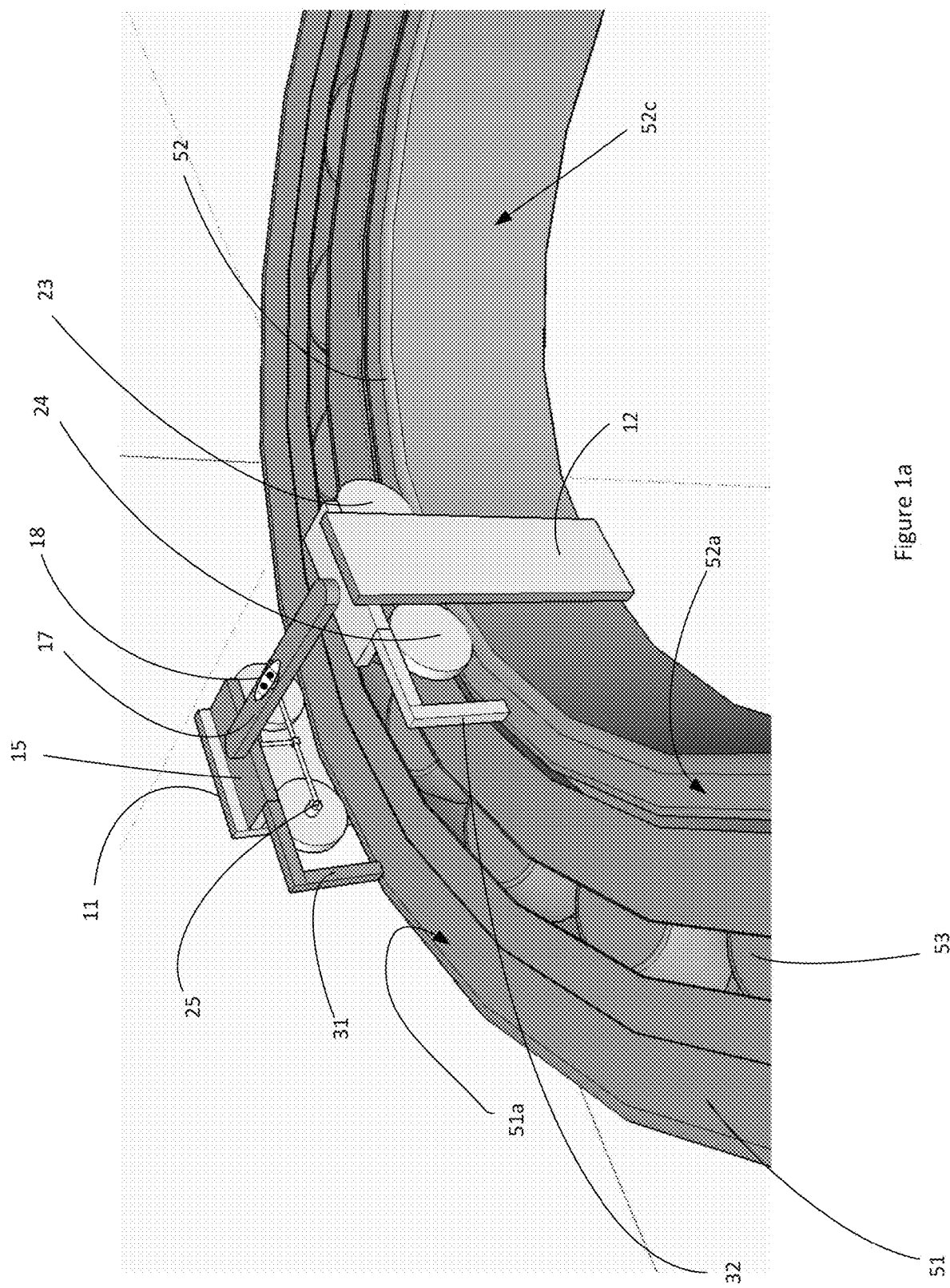
FIG. 1a presents a perspective view of an induction heater according to the invention arranged on a rolling element bearing.
Figure 1B:
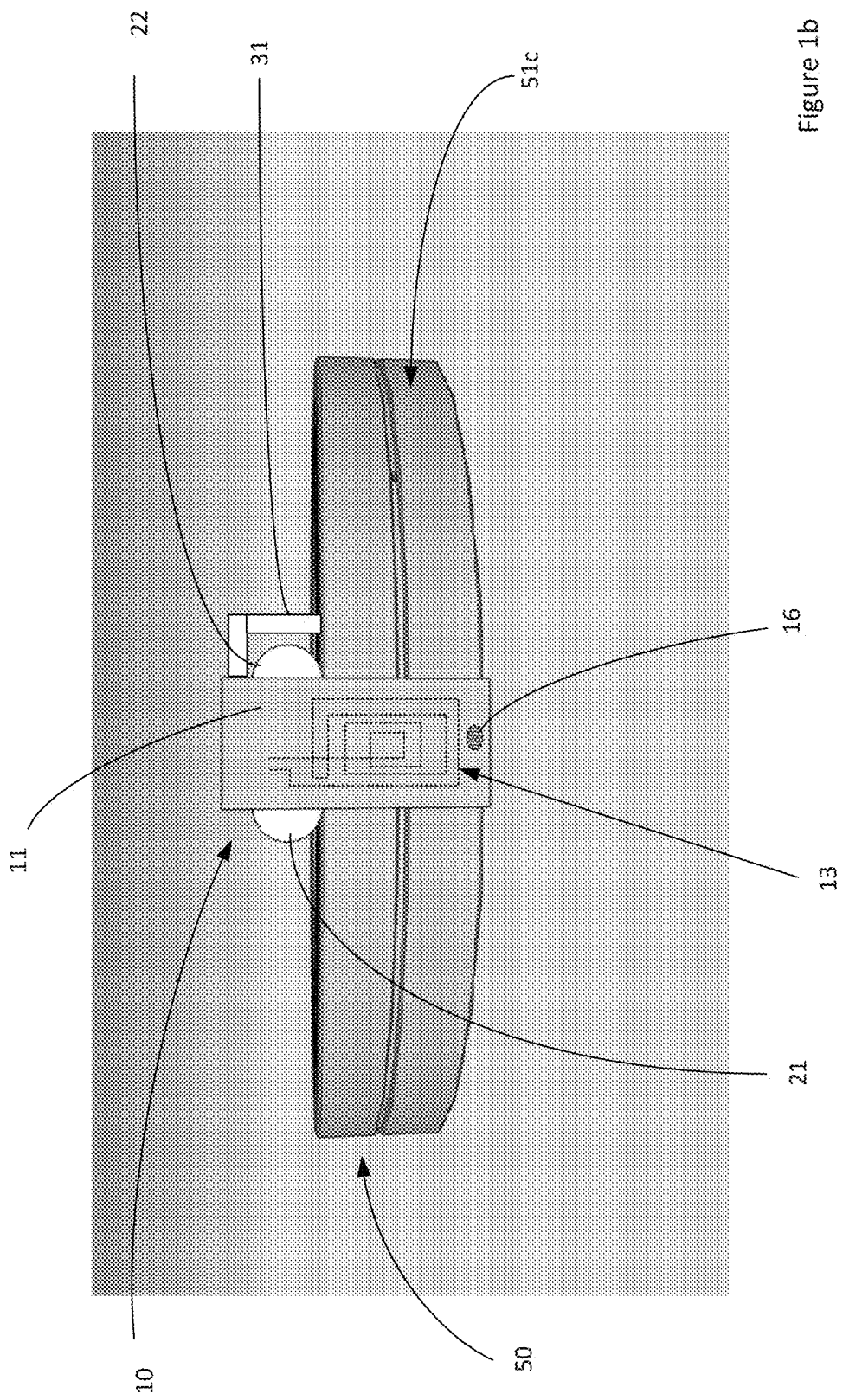

An example of an induction heating device according to the invention is schematically shown in perspective view in FIG. 1a and side view in FIG. 1b. The device 10 is adapted for heating a rolling element bearing 50, having an outer ring 51, inner ring 52, and at least one row of rolling elements 53, to expand a bore diameter of the bearing such that it may be mounted on a shaft. The device is configured to travel on surfaces of the bearing during the induction heating process.

The induction heating device 10 has first and second heating plates 11, 12 which accommodate first and second heating coils. The first heating coil 13 in the first heating plate 11 is represented by the dotted line in FIG. 1b. The heating plates 11, 12 are mounted to or form part of a support frame 15, which frame is mounted on wheels. A first wheel set having two wheels 21, 22 is arranged at a first side of the support frame 15 and a second wheel set having two wheels 23, 24 is arranged at a second side of the support frame. In use, the first wheel set 21, 22 runs on a side face 51a of the outer ring 51 and the second wheel set 23, 24 runs on a side face 52a of the inner ring 52. The first and second heating plates 11, 12 extend beyond the plane of the bearing side faces 51a, 52a such that the first heating plate 11 faces an outer circumferential surface 51c of the outer ring 51 and the second heating plate 12 faces an inner circumferential surface 52c of the inner ring 52. A linkage bar 17 connects the first and second sides of the support frame 15. Suitably, the linkage bar 17 is adjustable in length, so that the width of the device 10 can be adjusted according to the size of the bearing.

Furthermore, the device comprises first and second guide elements that engage with the outer and inner circumferential surfaces respectively, to ensure that the device travels on a circular path during heating. In the depicted example, each heating plate 11, 12 comprises a stud that contacts the corresponding circumferential surface 51c, 52c. The stud is represented in FIG. 1b by the outlined circle with reference numeral 16, although would not normally be visible in the depicted view. The stud serves as a plain bearing and is preferably made of a low-friction, heat-resistance material. Nylon is one example of a suitable material. The guide element may also be a ball or a roller that is able to rotate on the corresponding circumferential surface. The first and second guide elements may also form part of the support frame 15.

In the depicted example, the linkage bar 17 is provided with a power point 18, which is electrically connected to the first and second induction coils. A cable supplying alternating current may thus be connected to the device 10. In use, the first and second heating coils induce localized eddy currents in the outer and inner circumferential surfaces 51c, 52c of the bearing 50, causing a rise in temperature. The bearing outer ring 51 has a larger mass than the bearing inner ring 52, meaning that more energy is required to induce the same temperature rise as in the inner ring. Consequently, it is advantageous if the first heating plate 11 and first induction coil 13 are larger than the second heating plate 12 and the second heating coil, so that localized eddy currents are induced in a larger surface area.

To induce a uniform rise in temperature around the bearing circumference, the device according to the invention drives in a circle on the bearing ring side faces 51a, 52a such that the first and second heating plates 11, 12 travel around the outer and inner circumferential surfaces 51c, 52c of the outer and inner bearing rings respectively. Thus, at least one of the wheels 21, 22, 23, 24 is driven via e.g. an electric motor. In the depicted example, each of the wheels is driven by a motor 25 that is mounted to the support frame 15. Alternatively, the wheels of one wheel set may be driven wheels, e.g. the first wheel set 21, 22, while the wheels 23, 24 of the second wheel set are non-driven.

In a preferred embodiment, the speed of travel of the device 10 is controllable based on measured temperature inputs from temperature sensors that measure the temperature of the bearing at one or more locations. In the depicted example, the device 10 is equipped with a first temperature sensor 31 for measuring the temperature of the outer ring 51 and with a second temperature sensor 32 for measuring the temperature of the inner ring 52.

Let us assume that the inner ring 52 of the bearing 50 needs to be heated to a temperature of approximately 120° C. The inventive heating device 10 is placed on the bearing such that the first wheel set 21, 22 runs on the side face of the outer ring 51 and the second wheel set 23, 24 runs on the side face of the inner ring 52. The electric motors 25 are activated and alternating current is supplied to each of the first and second induction coils. Let us further assume that the device travels in a clockwise direction, in relation to bearing shown in FIG. 1*a*.

Initially, the speed of travel of the device may be set based on fixed parameters of the bearing, such as the dimensions and mass of the bearing rings. The initial speed may be set at a relatively low level, to enable a relatively fast rise in local temperature of the bearing. The first temperature sensor 31 measures the outer ring temperature at a location corresponding to a circumferential position that has just been passed by the first heating plate 11; the second temperature sensor 32 measures the inner ring temperature at a location corresponding to a circumferential position that has just been passed by the second heating plate 12. In this example, a portion of the temperature sensors 31, 32 is in contact with the respective bearing ring and the sensors transmit a signal to a control unit (not shown), which controls the electric motors 25 in order to adjust the speed of travel. The signal from the temperature sensors 31, 32 is also received by a control circuit of the current generator.

In one example, the control unit is configured to drive the device at the initial speed until e.g. the inner ring reaches a certain intermediate value of say 50° C. Thereafter, the control unit may adjust the speed based on the rate of temperature rise of the inner ring, whereby speed is increased if the rate becomes too high.

In addition, the control circuit of the current generator is configured to monitor the temperature difference between the inner and outer rings and to control the supply based on the temperature difference, to prevent the difference from exceeding a maximum allowable threshold of e.g. 30° C. For example, if the inner ring temperature sensor 32 measures a temperature that is 25° C. higher than the temperature measured by outer ring temperature sensor 31, the control circuit may be programmed to deactivate or reduce the current supply to the second induction coil and reactivate or increase it when the temperature difference has fallen to e.g. 17° C. The heating process is continued until the target inner ring temperature is reached.

A number of aspects/embodiments of the invention have been described. It is to be understood that each aspect/embodiment may be combined with any other aspect/embodiment. Moreover, the invention is not restricted to the described embodiments, but may be varied within the scope of the accompanying patent claims.

What is claimed is:

1. An induction heating device comprising:
   at least one induction coil mounted to a support frame, said support frame being adapted to travel on a surface of an annular metal article to be heated and is provided with a wheel set having one or more driven wheels,
   wherein the support frame is adapted to travel on a side face of the annular metal article and is further provided with a first guide element and a second guide element, at a corresponding first side of the device and a second side of the device,
   wherein the first guide element and the second guide element are respectively configured to engage with an outer circumferential surface and an inner circumferential surface of the annular metal article, to ensure that the support frame travels on a circular path during use of the device.

2. The induction heating device of claim 1, wherein the first side of the device and the second side of the device are connected by a linkage that is adjustable in length.

3. The induction heating device of claim 1, wherein the at least one induction coil is arranged to face the surface on which the support frame travels during use of the device.

4. The induction heating device of claim 1, wherein the at least one induction coil includes a first induction coil and a second induction coil,
   wherein the first induction coil extends over and faces the outer circumferential surface of the annular metal article,
   wherein the second induction coil extends over and faces the inner circumferential surface of the annular metal article.

5. The induction heating device of claim 1, wherein the at least one induction coil is arranged in a heating plate.

6. The induction heating device of claim 5, wherein the heating plate is adapted to face a circumferential surface of the annular metal article,
   the heating plate further comprising a heating surface that is curved to match a curvature of the circumferential surface.

7. The induction heating device of claim 6, wherein the heating plate has a flexible construction that allows the curvature of the heating surface to be adjusted.

8. The induction heating device of claim 1, further comprising a control unit for adjusting an amount of torque that is supplied by a drive mechanism to the one or more driven wheels, so as to control a travel speed of the device.

9. The induction heating device of claim 8, wherein the control unit has at least one temperature signal input and is programmed to control the travel speed of the device based on a measured temperature of the article being heated.

10. The induction heating device of claim 9, wherein the control unit is integrated on the support frame.

11. The induction heating device of claim 8, wherein the control unit is a remote unit,
    the drive mechanism further comprising a signal input for receiving a control signal from the control unit.

12. The induction heating device of claim 1, further comprising a power source, the support frame further comprising a power cable connection point enabling alternating current to be supplied to the at least one induction coil.

13. The induction heating device of claim 12, the power source further comprising a control circuit with at least one temperature signal input, wherein the control circuit is configured to regulate an amount of power supplied to the at least one induction coil based on a measured temperature of the annular metal article being heated.

14. The induction heating device of claim 1, further comprising at least one temperature sensor mounted to the support frame for measuring a temperature of the annular metal article being heated.

15. An induction heating system, comprising:
the induction heating device of claim 13,
the annular metal article being heated comprises a rolling element bearing having an outer ring and an inner ring,
the at least one induction coil comprising a first induction coil for heating the outer ring and a second induction coil for heating the inner ring,
the control circuit further comprising:
a first temperature signal input for a temperature measured on the outer ring and
a second temperature signal input for a temperature measured on the inner ring,
wherein the control circuit is configured to regulate the amount of power supplied to each induction coil based on a measured temperature difference between the outer ring and the inner ring.

* * * * *